United States Patent Office 3,219,423
Patented Nov. 23, 1965

3,219,423
COMPOSITE THERMOSTATIC MATERIALS AND THERMOSTATS MADE THEREFROM
Raymond M. Sears and Unto U. Savolainen, Attleboro, Mass., assignors to Texas Instruments Incorporated, Dallas, Tex., a corporation of Delaware
Filed Jan. 9, 1963, Ser. No. 250,421
7 Claims. (Cl. 29—183.5)

This invention relates to composite thermostatic materials and to thermostats made therefrom, and with regard to certain more specific features, to such items useful as parts in electrical circuits.

Among the several objects of the invention may be noted the production of such improved composite thermostatic metals and thermostats made therefrom as will meet substantially definite specifications of electrical resistivity while at the same time maintaining optimum, preferably large, flexivity; the provision of such articles which will maintain specified resistivities and flexivities substantially without change throughout their working lives; and the provision of such articles which may be produced economically and rapidly on a mass production basis. Other objects and features will be in part apparent and in part pointed out hereinafter.

The invention accordingly comprises the elements and combinations of elements, features of construction, and arrangements of parts which will be exemplified in the constructions hereinafter described, and the scope of the application of which will be indicated in the following claims.

Figure 1:
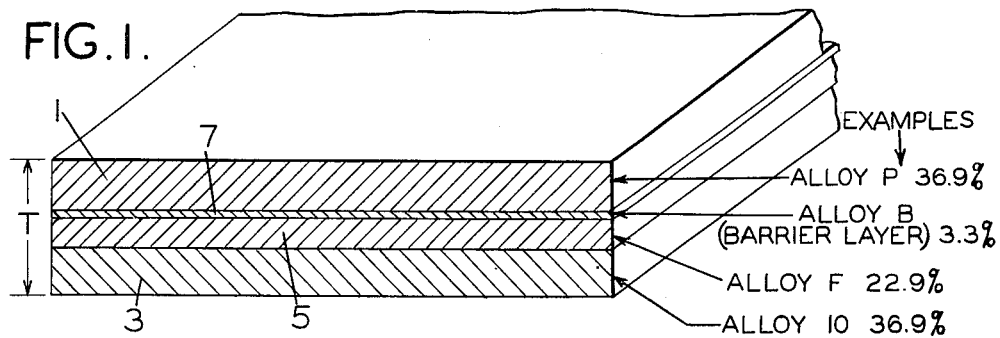
Figure 2:
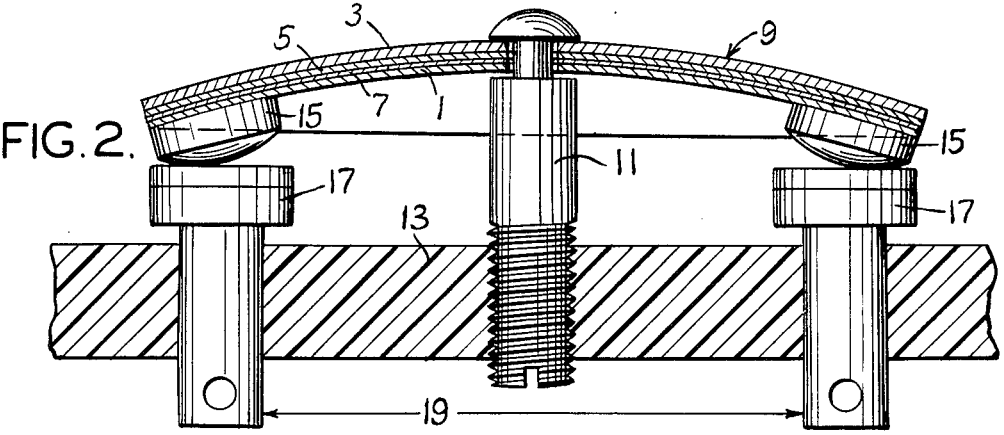
Figure 3:
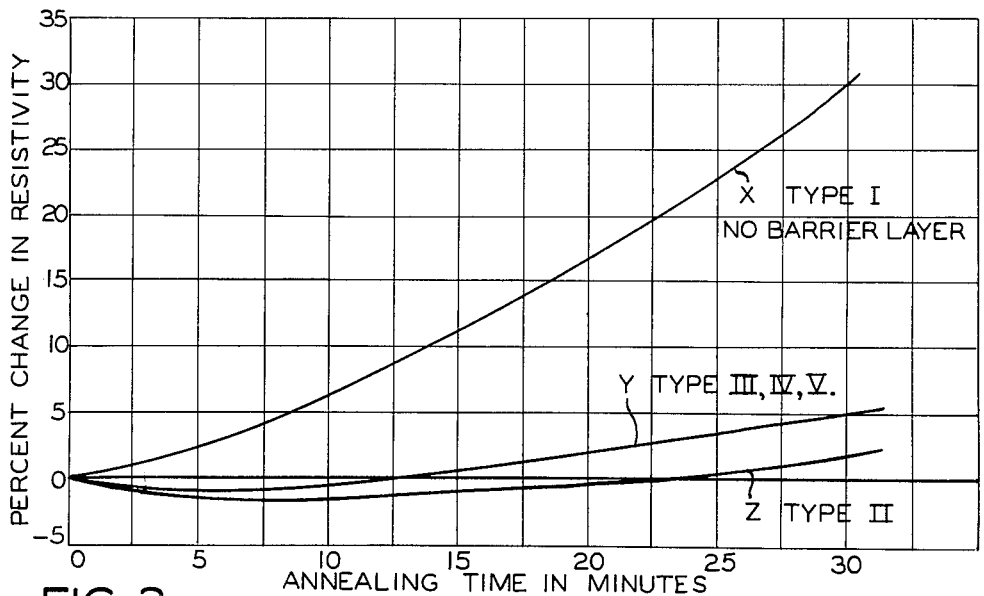

In the accompanying drawings, in which several of various possible embodiments of the invention are illustrated, FIG. 1 is an enlarged diagrammatic view of a typical composite metal sheet made according to the invention;

FIG. 2 is an enlarged diagrammatic view of a thermostat made according to the invention; and FIG. 3 is a graph illustrating improved features of the invention.

Corresponding reference characters indicate corresponding parts throughout the drawings.

The term flexivity as used herein means the change of curvature of a specimen per unit of temperature change per unit of its thickness. The term resistivity is defined as ohms per circular mil foot of the material constituting the specimen. The term metals as used herein includes alloys.

Presently known composite thermostatic metals suitable for making thermostats have metallic components of high and low coefficients of thermal expansion which are metallurgically bonded as, for example, by solid-phase bonding of several of such components. By solid-phase bonding is meant bonding such as taught, for example, in U.S. Patents 2,691,815 and 2,753,623. Among the criteria determining the selection of metals is an optimum flexivity desired in the finished article. For example, but without limitation, high flexivity is desired of thermostats employed in circuit breakers, because such flexivity permits easier calibration by making latching distances less critical to temperature. Higher flexivity also permits of a reduction in the volume of material required to develop a given force during movement. For example, a pair of presently known high-flexivity thermostatic components may comprise what is known as alloy P (composed of approximately 72% manganese, 18% copper and 10% nickel) and alloy 10 (otherwise known as Invar and composed of approximately 36% nickel and the balance iron). A thermostat made of such a combination of metals has a high flexivity. Other optimums of flexivity may be desired but the high one noted is an example of one which is in many cases preferable.

Many thermostats are resistance-heated by placing their thermostatic elements in electrical circuits. Some desirable metal components such as above noted have high electrical resistivities. Those for alloy P and alloy 10 are on the order of 1030 and 480 ohms per circular mil foot, respectively. Their composite resistivity when joined to form components of thermostatic material is about 675 ohms per circular mil foot. It is often desirable that such joined components shall have other composite resistivities, for example, in the range of approximately 15–575 ohms per circular mil foot. In order to provide a desired composite resistivity, it has heretofore been the practice to interpose or sandwich a third so-called shunt layer of conductive material between the high and low thermal expansion components. The thickness and resistivity of such a third shunt layer is chosen to provide the desired composite resistivity with the optimum flexivity desired in the composite thermostatic material.

In the case of the above-mentioned alloy P and alloy 10 components, there have been used therewith a shunt component layer of copper-rich alloy F (for example, substantially 98% copper and 2% silver, or a substantially 98.5% by weight copper and 1.5% by weight cadmium alloy) or nickel-rich alloy N (substantially pure nickel). This has been introduced as a metallurgically bonded layer between the alloy P and alloy 10 materials, to provide the desired over-all resistivity in the range of from approximately 15 to 575 ohms per circular mil foot. It has been found, however, that a copper-rich or nickel-rich third layer between the thermostatic layers is incompatible with the high-expansion layer of alloy P. By this is meant that undesirable diffusion takes place, especially during the annealing step which is employed during fabrication by metallurgical, and more particularly solid-phase bonding. Such diffusion may to some extent occur even after annealing and during the working life of the finished material. Diffusion caused by annealing results in non-uniform increases, sometimes as much as 35% or more, in the over-all resistivity of the finished composite thermostatic material or thermostat. The diffusion affects a certain thickness of materials at the interface of the two reactive components (for example, alloy P and copper-rich alloy F), depending on the time and temperature of the usual annealing step employed during manufacture. It is apparent that a greater proportion of the total thickness of the composite thermostatic metal is affected by a given amount of diffusion when the total thickness of the finished article is smaller than when the thickness is larger. Consequently, changes in over-all resistivity unpredictably vary from production lot to production lot, depending upon such factors as the final thickness of the resulting product, the final thickness of the alloy F layer, the percentage thickness ratio of the incompatible layer of the resulting product and also upon the times and temperature of annealing.

We have discovered that by employing a suitable diffusion-barrier layer between the high-expansion layer and the shunt layer of such small thickness that the barrier layer exerts negligible influence on the flexivity of the composite material, a desired and predictable composite resistivity may be obtained, together with the advantage of a resulting optimum (preferably high) flexivity. Examples of appropriate diffusion-barrier layers are alloy B (approximately 22% nickel, 3% chromium and the balance iron); AISI 304 stainless steel; AISI 430 stainless steel; or SAE 1006 low-carbon steel. AISI is an abbreviated designation of the American Iron and Steel Institute. SAE is an abbreviated designation of the American Society of Automotive Engineers.

Referring now more particularly to FIG. 1, it illustrates a composite thermostatic material made according to the invention, the total thickness of which may be on the order of from .003 inch to .125 inch or so. Numerals 1 and 3 are the components of high and low coefficients of thermal expansion, as for example, the above-mentioned alloy P and alloy 10, respectively. Numeral 5 indicates the high-conductive shunt layer composed, for example, of copper-rich alloy F. Layer 5 is compatible with layer 3 but not with layer 1. Numeral 7 indicates the diffusion-barrier layer which, for example, may be alloy B. This prevents contact between the incompatible layers 1 and 5.

As above-mentioned, the barrier layer 7 should be comparatively thin. Thus appropriate relative thicknesses of the layers 1, 3, 5 and 7 may be 36.9%, 36.9%, 22.9% and 3.3%, respectively. It is preferable that the barrier layer 7 be not greater than about 5% of the total thickness T. Materials other than alloy P and alloy 10 may be used for the layers 1 and 3, which are primarily responsible for the degree of flexivity. For shunt layer 5 other than low-resistance alloy F may be employed, such as for example the nickel-rich alloy N. For the diffusion-barrier layer 7, materials other than alloy B may be used, such as for example the above-mentioned 304 stainless steel, 430 stainless steel or 1006 low-carbon steel.

In FIG. 2 is illustrated a typical snap-acting type of thermostat made from materials such as above described. This is in the form of a deformed disc or plate 9 of material such as shown in FIG. 1 but turned over so that the sequence of layers 1, 7, 5, 3 is inverted. The plate is mounted on a post 11 carried on a base 13. The plate 9 carries contacts 15 on the high-expansion layer 1. The contacts 15 are engageable and disengageable with fixed contacts 17. Contacts 17 are in an electrical circuit 19. In a cool condition of the disc 9, movable contacts 15 engage fixed contacts 17, so that the disc 9 carries current. It will thus be heated an amount determined by its resistivity to snap to a circuit-opening condition. It will be understood that while FIG. 2 shows a snap-acting thermostat, slow-acting thermostats may also be made from the material above described; also that a thermostat made according to the invention may have any one of various functions such as circuit control, operation of switch gear or the like.

FIG. 3 and the first table below illustrate the effectiveness of the use of a diffusion-barrier layer such as above described. This table and FIG. 3 were obtained by preparing a series of thermostatic metals according to types, arbitrarily designated herein as type I, II, III, IV and V. In this table, the percentages of thicknesses of the various layers are given under the various type headings. The total thickness of the composite material was about .040 inch. The component materials employed for the layers are shown at the left. The type I material had no barrier layer. The barrier layer of type II was 304 stainless steel; that of type III was 430 stainless steel; that of type IV was 1006 low-carbon steel; and that of type V was alloy B. The materials were properly cleaned, solid-phase bonded under suitable conditions of heat and pressure known to the art, then rolled to size and samples taken. These samples were measured for resistivity after having been annealed for various times at 1400° F.

*First table*

| Component Materials | Type I | Type II | Type III | Type IV | Type V |
|---|---|---|---|---|---|
| P Alloy, percent | 50 | 46 | 46 | 46 | 46 |
| Barrier Layer, percent | None | 5 | 5 | 5 | 5 |
| F Alloy, percent | 7 | 7 | 7 | 7 | 7 |
| 10 Alloys, percent | 43 | 42 | 42 | 42 | 42 |

The second table below tabulates for the various types I–V of the thermostatic metals the resistivity in ohms per circular mil foot and the percentage change of such resistivity for various five-minute intervals of annealing time. All percentage changes which are negative are indicated by minus signs.

*Second table*

| Annealing time | Type I | Type II | Type III | Type IV | Type V |
|---|---|---|---|---|---|
| 0 Min.: | | | | | |
| ohms/cmf | 163.5 | 176.5 | 145 | 131.5 | 144 |
| Percent | 0 | 0 | 0 | 0 | 0 |
| 5 Min.: | | | | | |
| Ohms/cmf | 168.4 | 174 | 145 | 130 | 143.2 |
| Percent | 2.9 | −1.4 | 0 | −1.0 | −0.5 |
| 10 Min.: | | | | | |
| Ohms/cmf | 173.8 | 174 | 144 | 131 | 144 |
| Percent | 6.3 | −1.3 | −0.6 | −0.3 | −0.1 |
| 15 Min.: | | | | | |
| Ohms/cmf | 181.8 | 175.8 | 145.5 | 132.8 | 145 |
| Percent | 11.0 | −0.5 | 0.5 | 0.8 | 0.8 |
| 20 Min.: | | | | | |
| Ohms/cmf | 192.0 | 176 | 147 | 134 | 146.5 |
| Percent | 17.4 | −0.3 | 1.4 | 2.0 | 1.8 |
| 25 Min.: | | | | | |
| Ohms/cmf | 204.0 | 179 | 150 | 136.4 | 149.2 |
| Percent | 24.7 | 1.5 | 3.4 | 3.7 | 3.7 |
| 30 Min.: | | | | | |
| Ohms/cmf | 213.0 | 179 | 152 | 138 | 151.2 |
| Percent | 30.2 | 1.5 | 4.8 | 5.0 | 5.1 |

The graph shown in FIG. 3 plots the results exhibited in the second table set out above. In this graph the ordinates represent percentage change in resistivity and the abscissa represent various annealing times in minutes. Line X on this graph illustrates how, without the use of a barrier layer (type I) the resistivity rapidly changes with increase in annealing time. Line Y represents three curves (which are substantially coincident) for types III, IV and V. Line Z represents change in resistivity for type II. The graphs of FIG. 3 show that types I, III, IV and V, each employing a diffusion-barrier layer, have smaller variations in resistivity with change in annealing time. Thus FIG. 3 shows the effectiveness of the barrier layers in preventing diffusion and detrimental increase in resistivity as annealing times change. This increase due to the diffusion is the undesirable characteristic elsewhere herein referred to as incompatibility.

The barrier layers of 430 stainless steel (type III), 1006 low-carbon steel (type IV) and alloy B (type V) are all essentially the same in effectiveness in preventing diffusion. They reduce the diffusion effect in resistivity after 30 minutes of annealing to one-sixth of that prevailing when no barrier layer is employed. Normally, annealing is performed in about 15 minutes or less and it is apparent that after annealing, for such a time or for greater or lesser times these barrier layers very appreciably reduce the diffusion effect, as indicated by the smaller changes in resistivity. The negative changes reflect a slight drop in resistivity. A 304 stainless steel layer (type II) is in general the most effective barrier material with which we are at present familiar to prevent diffusion.

In some cases it is possible to carry out the invention by use only of three layers of material rather than the four layers illustrated, although the four-layer arrangement is preferred. Thus in FIG. 1 the alloy 10 layer may sometimes be omitted, the alloy F layer being relied upon to provide, first, the desired resistivity and, second, in connection with the alloy P layer an appropriate flexivity. In such a case, layers 1 and 5 alone constitute the layers having the different coefficients of thermal expansion which provide thermostatic flexing action, that of layer 1 being the higher. Such a three-layer form of the invention may be made up as an intermediate pre-tailored product adapted to be sold for ultimate bonding with a layer such as 3.

The flexivities of the new materials that can be made according to the invention in its four-layer form are about 30%–55% greater than the flexivities of available conventional materials having comparable or equivalent resistivity characteristics. Photomicrographs of samples of materials made with and without barrier layer 7 have shown that when no barrier layer is employed more than one-half of a layer such as 5 has diffused into the layer such as 1. A barrier layer such as 7 effectively prevents substantially all diffusion between layers 5 and 1, with the result that substantially all of the flexivity inherent in the originally chosen layers 1 and 3 is maintained, along with the original composite resistivity designed into the material by the proper choice of thickness of the conductive shunt layer 5. Summarizing, the invention results in the ability to produce thermostatic materials and thermostats with high flexivities and tailored composite electrical resistivities particularly in the range of approximately 15 to 575 ohms/c.m.f.

Inasmuch as all of the layers mentioned may be solid-phase bonded by rolling, the improved material may be manufactured rapidly under conditions of mass production.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A composite thermostatic material of substantially invariable resistivity and flexivity, comprising at least four nonbrittle layers of metallurgically bonded metals having a total thickness in the range of approximately .003 to .125 inch, first and second layers of which are composed of metals having comparatively higher and lower coefficients of thermal expansion respectively to provide for flexing in response to temperature change, a third electrical-shunt layer located adjacent to and in bonded contact with said second layer and composed of a metal which has a comparatively low electrical resistivity relative to that of the first layer and which is compatible therewith so that any substantial diffusion therebetween is absent, said shunt layer being incompatible with the first layer as regards diffusion, and a fourth layer sandwiched between the first and third layers in bonded contact with each and composed of a material which is compatible with said first and third layers and forming a diffusion-barrier layer therebetween, the thickness of the fourth layer being not more than approximately 5% of said total thickness.

2. A composite thermostatic material according to claim 1, wherein the metal of said fourth layer is selected from the group consisting first of an alloy of approximately 22% nickel, 3% chromium and the balance iron; second, AISI 304 stainless steel; third, AISI 430 stainless steel; and, fourth, SAE 1006 low-carbon steel.

3. A composite thermostatic material comprising at least four layers of metallurgically bonded metals, first and second spaced layers which have comparatively higher and lower coefficients of thermal expansion respectively, said first layer consisting of approximately 72% manganese, 18% copper and 10% nickel, said second layer consisting of approximately 36% nickel and the balance iron, a third electrical-shunt layer which is located adjacent to and in bonded contact with said second layer and has a comparatively low electrical resistivity, said third layer consisting of metals selected from the group consisting of, first, substantially pure nickel, second, an alloy of not less than approximately 98% copper and not more than approximately 2% silver and, third, an alloy of approximately 98.5% copper and approximately 1.5% cadmium, and a fourth layer sandwiched between the first and third layers to form a diffusion-barrier layer therebetween, said fourth layer being composed of a metal selected from the group consisting of AISI 304 stainless steel, AISI 430 stainless steel, SAE 1006 low-carbon steel and an alloy of approximately 22% nickel, 3% chromium and the balance iron.

4. A composite intermediate thermostatic material comprising a pair of layers composed of metals having different coefficients of thermal expansion, the one having the lower coefficient having a comparatively low resistivity to function as an electrical-shunt layer, and a diffusion-barrier layer sandwiched therebetween, said diffusion-barrier layer being substantially thinner than either of said pair of layers and being metallurgically bonded to both, the one of the pair having the lower coefficient consisting of a metal selected from the group consisting of, first, substantially pure nickel; second, an alloy of not less than approximately 98% copper and 2% silver; and, third, an alloy of approximately 98% copper and 1.5% cadmium, said diffusion-barrier layer being composed of a metal selected from the group consisting of AISI 304 stainless steel; AISI 430 stainless steel; SAE 1006 low-carbon steel; and an alloy of approximately 22% nickel, 3% chromium and the balance iron.

5. A composite thermostatic material according to claim 3, wherein the thickness of said fourth layer is not more than approximately 5% of the total thickness of the composite material.

6. A composite thermostatic material according to claim 5, wherein the thickness of each of said first and second layers is on the order of 40% of the total thickness of the composite material.

7. A composite thermostatic material according to claim 6, wherein the total thickness of the composite material is on the order of .125 inch or less.

References Cited by the Examiner

UNITED STATES PATENTS

| | | | |
|---|---|---|---|
| 2,194,738 | 3/1940 | Chare | 29—195.5 |
| 2,232,656 | 2/1941 | Davis | 29—195.5 |
| 2,240,824 | 5/1941 | Alban | 29—195.5 |
| 2,341,858 | 2/1944 | Dubiler | 29—195.5 |
| 2,470,753 | 5/1949 | Alban | 29—195.5 |
| 3,102,793 | 9/1963 | Alban | 29—195.5 |

DAVID L. RECK, *Primary Examiner.*

HYLAND BIZOT, *Examiner.*